April 14, 1931.  W. DARBYSON  1,800,439
AIRPLANE
Filed April 7, 1930
Fig.1.
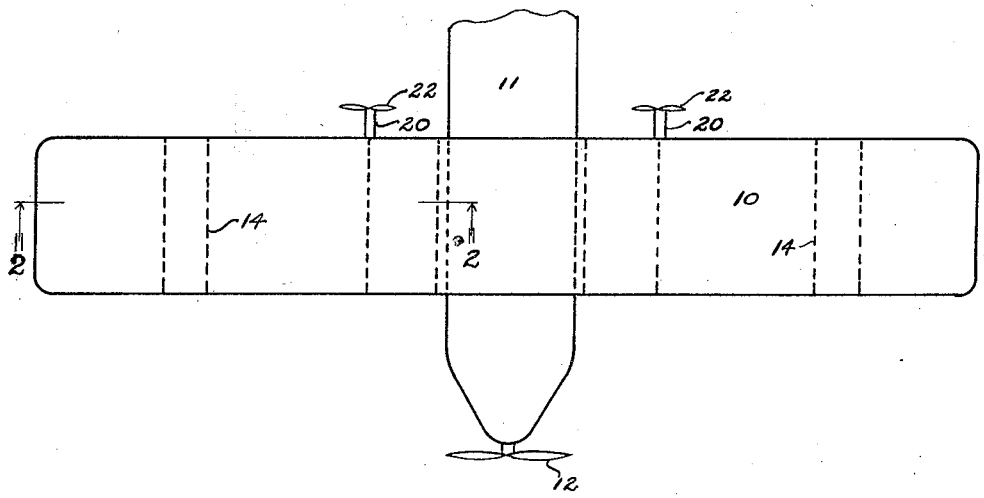
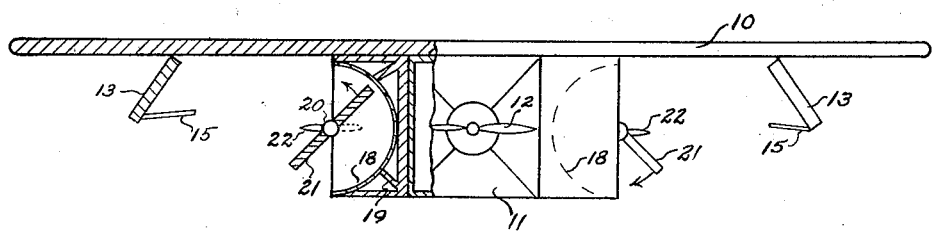
Fig.2.
INVENTOR
Walter Darbyson
BY
Francis D. Hardesty.
ATTORNEY Patented Apr. 14, 1931

1,800,439

REISSUED

UNITED STATES PATENT OFFICE

WALTER DARBYSON, OF WINDSOR, ONTARIO, CANADA

AIRPLANE

Application filed April 7, 1930. Serial No. 442,062.

This invention relates to airplanes and more particularly to devices for causing the vertical rise of an airplane of the heavier-than-air or rigid type.

An object of this invention is a device applicable to airplanes of the class above described which, upon operative movement causes a true vertical rise of the airplane.

A further object is a device which, when operated will cause an airplane to remain motionless, without descending.

A still further object is an attachment for airplanes which is simple in its construction and which has means forming a part thereof to provide an auxiliary drive for the airplane.

Still other objects will readily occur to those skilled in the art upon reference to the following description and the accompanying drawings in which Fig. 1 is a plan view of an airplane equipped with the device of the present invention.

Fig. 2 is a front elevation view thereof, partly in section along the line 2—2 of Fig. 1.

Referring to the drawings, there is shown an airplane of the monoplane type having a wing 10, fuselage 11, and the usual propeller 12. The construction thus far is conventional and forms no part of the present invention.

Attached to the underside of the wing 10 are vanes or fins 13 pivotally movable about the line indicated at 14 and adapted to be controlled by means such as the control rods 15. Adjacent each vane 13 is a casing 18 supported in any suitable manner, such as by supports 19, and having therein a shaft 20 upon which is mounted a fan blade 21 and at the rear end of which is mounted a propeller 22.

As indicated, vanes 13, casings 18, shafts 20, and fan blades 21 extend transversely along the wing and may be of a length equal to the width of the wing.

The operation of the device will be obvious from the foregoing. Rotation of each fan in the direction indicated by the arrows will cause the flow of a stream of air thru each semi-circular casing 18, against the underside of the wing 10 and against the suitably deflected vane 13, whereupon the air pressure will cause elevation or rising of the airplane.

Furthermore, when the airplane is in motion and it is desired to hover about a suitable landing point, each fan 21 is rotated to counteract the force of gravity tending to lower the plane.

It will be understood that each vane or fin 13 is movable to lie against the underside of, or within the wing 10 during flight of the plane so that no unnecessary air resistance is offered.

Furthermore, it will be noted that the propellers 22 will function as an auxiliary driving means when shafts 20 are rotated, this construction being employed, as a rule, only when the main power plant is not functioning properly or when additional force is desired, or when a slow or hovering speed is required.

It will be understood that the shafts 20 may be rotated by separate engines or by the main engine, usually located in the fuselage, connection between the main engine and the shaft being had by suitably provided gearing or the like.

It will also be noted that the vanes 13 may be controlled from the inside or outside of the wing, as desired. Furthermore, the device may be applied to any suitable type of plane including monoplanes, bi-planes, etc. Furthermore, shafts 20 may be provided with any desired number of fan blades, the number depending upon the load to be carried by the plane.

Now having described the invention and the preferred embodiment thereof, it is to be understood that the said invention is to be limited, not to the specific details herein set forth, but only by the scope of the claim which follows.

Claim:

In an airplane having a wing, a fuselage centrally located beneath the wing and extending transversely thereof for a considerable distance, fan casings on the sides of said fuselage under the wing, fans in said casings mounted on shafts projecting to the rear of the wing, the shafts having propellers thereon, and vanes pivotally connected and secured to the undersurface of the wing, the fans discharging against the inclined under surfaces of the vanes.

WALTER DARBYSON.